(12) United States Patent
Ashley et al.

(10) Patent No.: US 8,464,311 B2
(45) Date of Patent: Jun. 11, 2013

(54) METHOD AND SYSTEM FOR IMPLEMENTING PRIVACY NOTICE, CONSENT, AND PREFERENCE WITH A PRIVACY PROXY

(75) Inventors: Paul Anthony Ashley, Bardon (AU); Sridhar R. Muppidi, Austin, TX (US); Mark Vandenwauver, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 2928 days.

(21) Appl. No.: 10/976,266

(22) Filed: Oct. 28, 2004

(65) Prior Publication Data

US 2006/0095956 A1  May 4, 2006

(51) Int. Cl.
*H04L 29/06* (2006.01)

(52) U.S. Cl.
USPC ......... 726/1; 726/4; 726/26; 726/27; 713/168

(58) Field of Classification Search
USPC .................. 726/1, 26, 27, 4; 713/168; 705/51
See application file for complete search history.

(56) References Cited

U.S. PATENT DOCUMENTS

| | | | |
|---|---|---|---|
| 6,959,420 B1* | 10/2005 | Mitchell et al. | 715/745 |
| 2002/0055912 A1* | 5/2002 | Buck | 705/76 |
| 2002/0104015 A1* | 8/2002 | Barzilai et al. | 713/201 |
| 2003/0088520 A1* | 5/2003 | Bohrer et al. | 705/74 |
| 2004/0044628 A1* | 3/2004 | Mathew et al. | 705/51 |
| 2004/0083243 A1* | 4/2004 | Feng et al. | 707/203 |
| 2004/0103306 A1* | 5/2004 | Paddock et al. | 713/200 |
| 2004/0103310 A1* | 5/2004 | Sobel et al. | 713/201 |
| 2005/0283443 A1* | 12/2005 | Hardt | 705/67 |
| 2006/0075122 A1* | 4/2006 | Lindskog et al. | 709/228 |

FOREIGN PATENT DOCUMENTS

| | | | |
|---|---|---|---|
| EP | 0990972 | * | 4/2000 |
| EP | 1081916 | * | 3/2001 |
| WO | WO 0145022 | * | 6/2001 |

OTHER PUBLICATIONS

"The Platform for Privacy Preferences 1.0 (P3P1.0) Specification", http://www.w3.org/TR/2002/REC-P3P-20020416, Apr. 2002, pp. 1-62.*

* cited by examiner

*Primary Examiner* — Kambiz Zand
*Assistant Examiner* — Tongoc Tran
(74) *Attorney, Agent, or Firm* — Jeffrey S. LaBaw; David H. Judson

(57) ABSTRACT

A method is presented for processing data for a privacy policy concerning management of personally identifiable information. A proxy intercepts a first message from a server to a client and determines that the first message initiates collection of personally identifiable information from a user of the client. The proxy then sends a second message to the client that requests consent from the user to the privacy policy. If the user provides consent within a third message that is received by the proxy from the client, then the proxy sends the intercepted first message to the client. If the user does not provide consent, then the proxy sends a fourth message to the server that fails the collection of personally identifiable information from the client by the server. The proxy may also obtain user preferences for options concerning management of the personally identifiable information by a data processing system.

27 Claims, 5 Drawing Sheets

METHOD AND SYSTEM FOR IMPLEMENTING PRIVACY NOTICE, CONSENT, AND PREFERENCE WITH A PRIVACY PROXY

CROSS-REFERENCE TO RELATED APPLICATIONS

The present application is related to the following application: application Ser. No. 11/014,561, filed Dec. 16, 2004, entitled "Method and system for implementing privacy policy enforcement with a privacy proxy", which is hereby incorporated by reference.

BACKGROUND OF THE INVENTION

1. Field of the Invention

The present invention relates to an improved data processing system and, in particular, to a method and apparatus for multicomputer data transferring. Still more particularly, the present invention provides a method and apparatus for multicomputer distributed resource management.

2. Description of Related Art

An individual interacts with many enterprises, e.g., institutions, organizations, and corporations, that maintain information about the individual for various purposes. In modern society, this information is maintained electronically, which allows the information to be processed much more efficiently than paper documents. However, concerns about the privacy of electronically managed information have grown with the adoption of Internet-based services, which allows enterprises to share information easily. Privacy has been defined as "the claim of individuals, groups, or institutions to determine for themselves when, how, and to what extent information about them is communicated to others", Westin, *Privacy and Freedom*, 1967.

Due to regulation and consumer concerns, many enterprises are having to re-evaluate their privacy management operations, such as the manner in which they handle personally identifiable information (PII) that they collect about individuals.

As a first step towards managing personally identifiable information, responsible enterprises usually create, implement, and enforce a privacy policy. Before an enterprise collects a user's personally identifiable information, the enterprise should obtain the user's consent to the privacy policy and should collect the user's preferences on any options that the enterprise may provide with respect to the manner in which the enterprise manages the user's personally identifiable information. FIG. 2A depicts a simple diagram showing an exchange of privacy promises 202 from a server 204 to a user 206 in exchange for the user's consent to the privacy promises and a selection of the user's privacy preferences 208.

The privacy policy generally includes a set of promises that an enterprise makes to users of services that are provided by an enterprise. At a low level, these privacy promises can be captured to some degree in a machine-readable format. An example of this is the Platform for Privacy Preferences Project (P3P), which has been developed by the World Wide Web Consortium; P3P has emerged as an industry standard for providing an automated way for users to gain more control over the use of personal information that is collected and managed by web sites which the users visit. P3P provides a mechanism for disclosing the manner in which a site handles personal information about its users; P3P-enabled web sites make this information available in a standard, machine-readable format, and P3P-enabled browsers can use this information automatically by comparing it to a user's previously-selected privacy preferences.

The privacy promises in the privacy policy state, at a high level, how the enterprise manages and possibly disseminates any personally identifiable information. For example, a privacy policy can be in human-readable format, such as text within a web page that includes legal terminology. FIG. 2B shows a graphical user interface window 210 that might appear when a user is perusing a web site; window 210 is a pop-up window that might appear on a user's screen in response to execution of a script that is embedded within a web page document that has been received by the user's browser application on a client device. The intention of window 210 is to provide notice to the user concerning the enterprise's, i.e. the web site operator's, privacy policy and to obtain an acknowledgment from the user that the user has read the privacy policy, e.g., by forcing the user to select check box 212 before the user can continue with an operation within the web site; the selection of hyperlink 214 will present the privacy policy in a human-readable format for the user, possibly by presenting another pop-up window on the user's screen or by directing the web browser to retrieve another web page. Window 210 also collects user preferences concerning some options with respect to the enterprise's privacy policy. Check box 216 gives the user control over an action that the enterprise might perform while using the user's personally identifiable information. Check box 218 gives the user control over whether the enterprise may share some of the user's personally identifiable information with other enterprises. "OK" button 220 closes window 210.

Using a mechanism similar to that shown in FIG. 2B, a user acknowledges the enterprise's privacy policy and indicates their acceptance to the privacy policy. This may also involve the user selecting some personal privacy preferences with respect to the management of the user's personally identifiable information. Once the user has acknowledged the privacy policy and indicated the user's preferences, then the enterprise can collect the user's personally identifiable information.

Current enterprise mechanisms for providing privacy promises and for collecting user consent and preferences require the implementation of privacy policy management within each application that is provided by the enterprise. For example, each web page that may cause the collection of personally identifiable information is modified to include links to the privacy policy along with web-based forms containing input controls for user-entry or user-selection of user preferences and consent. FIG. 2C shows a typical organization of privacy policy management within an enterprise domain 222 that is operating an e-commerce web site in which multiple e-commerce applications 224-228 are individually responsible for sending the enterprise's privacy policy to the user/client 230 and for individually collecting the user's consent and preferences to the privacy policy.

Each e-commerce application that is shown in FIG. 2C may be concerned with privacy policy issues with respect to different types of personally identifiable information, thereby requiring slightly different operations for collecting user consent and user preferences with respect to the different types of personally identifiable information. Hence, the prior art approach that is depicted in FIG. 2C is problematic. Each application that collects personally identifiable information must be modified to include privacy-related functionality, which may require multiple changes to different parts of each application. Application development costs increase as each application needs to be enhanced to include the privacy functions.

In addition, user consent and preferences are often collected multiple times within a single enterprise, possibly with the different applications collecting different data. Users of the enterprise services have dissatisfying experiences when navigating enterprise services and confronting a bewildering set of privacy-related operations. Moreover, an enterprise might not be sure that there is a consistent implementation of privacy-related functions within all applications. For example, the enterprise may be operating an application that collects data without providing users with appropriate notice, consent, and preference choices; subsequent discovery and remedy of such situations can greatly increase user dissatisfaction with the enterprise.

Therefore, it would be advantageous to have a method and system for implementing coherent, enterprise-wide, privacy-related functionality.

SUMMARY OF THE INVENTION

A method, a system, an apparatus, and a computer program product is presented for processing data that is associated with a privacy policy that concerns management of personally identifiable information within a data processing system. A proxy intercepts a first message from a server to a client and determines that the first message initiates collection of personally identifiable information from a user of the client. The proxy then sends a second message to the client, wherein the second message requests consent from the user of the client to the privacy policy. If the user provides consent within a third message that is received by the proxy from the client, then the proxy sends the intercepted first message to the client. If the user does not provide consent, then the proxy sends a fourth message to the server that fails the collection of personally identifiable information from the client by the server. The proxy may also obtain user preferences for options concerning management of the personally identifiable information by the data processing system.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
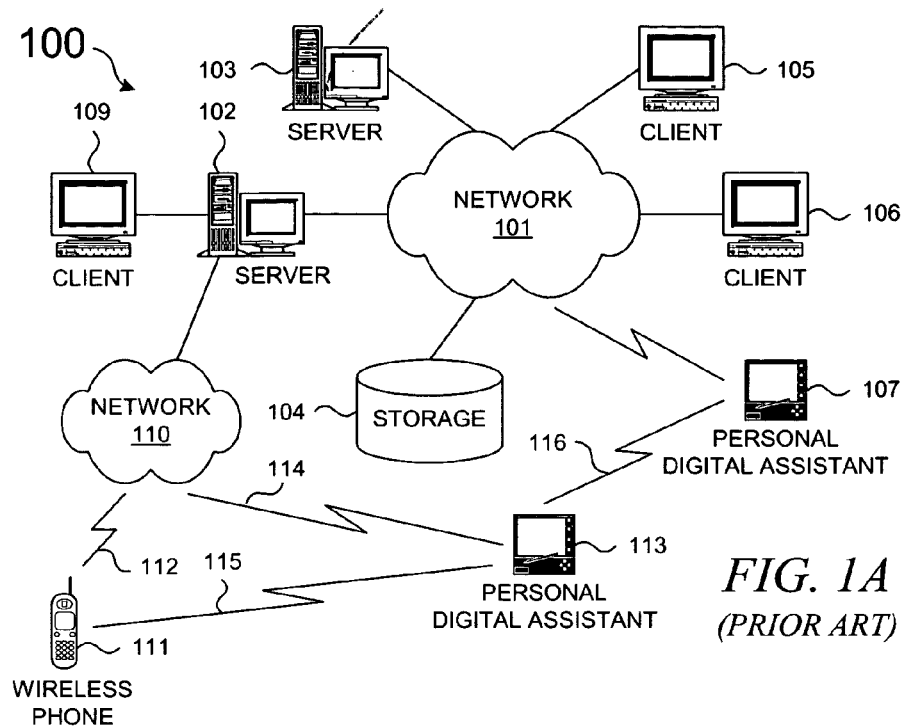
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
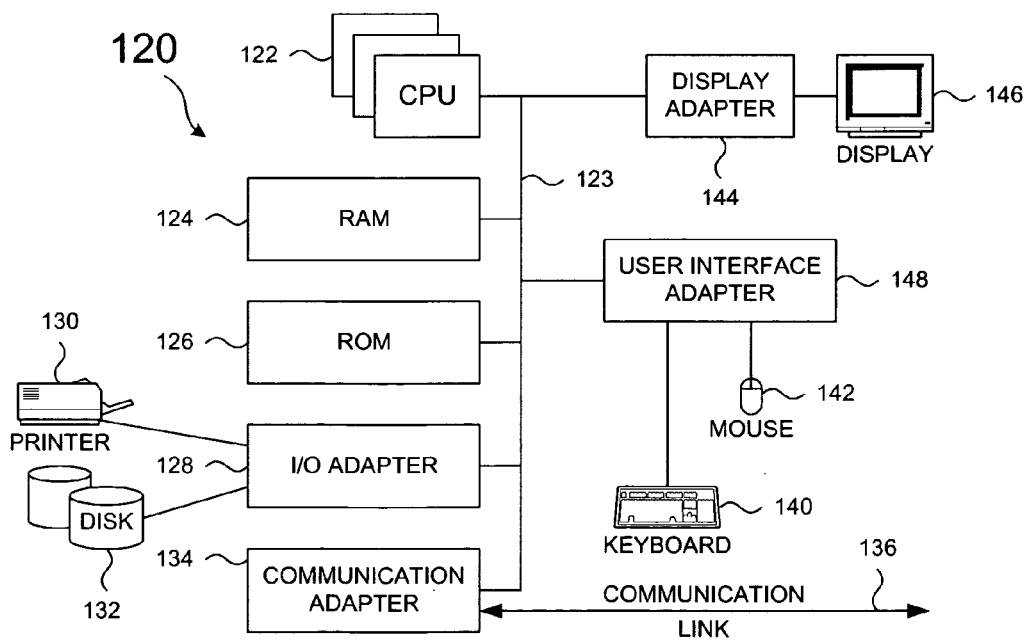
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved data processing environment. Prior to describing the present invention in more detail, a typical distributed data processing environment is described.

The descriptions of the figures herein involve certain actions by either a client device, a user of the client device, or a user agent that is operating on the client device. One of ordinary skill in the art would understand that responses and/or requests to/from the client are sometimes initiated by a user and at other times are initiated automatically by a client or a user agent, often on behalf of a user of the client. Hence, when a client or a user of a client is mentioned in the description of the figures, it should be understood that the terms "client" and "user" can be used interchangeably without significantly affecting the meaning of the described processes.

Figure 1C:
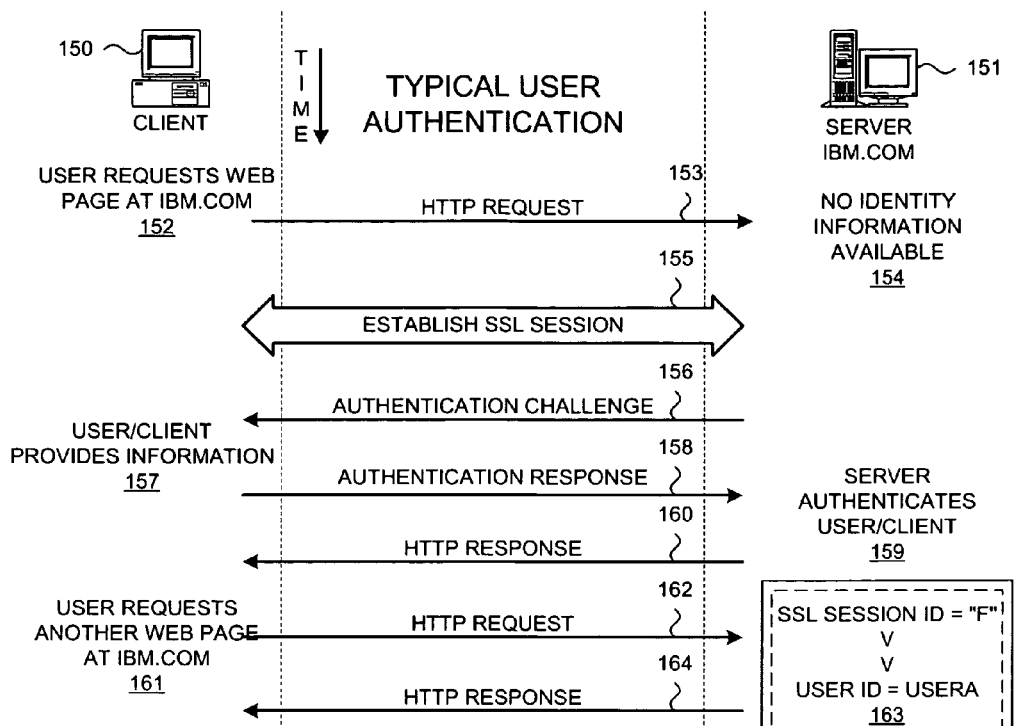
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected or controlled resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request (step 153) that is sent to the web server that is hosting the domain "ibm.com". The terms "request" and "response" should be understood to comprise data formatting that is appropriate for the transfer of information that is involved in a particular operation, such as messages, communication protocol information, or other associated information.

The server determines that it does not have an active session for the client (step 154), so the server initiates and completes the establishment of an SSL (Secure Sockets Layer) session between the server and the client (step 155), which entails multiple transfers of information between the client and the server. After an SSL session is established, subsequent communication messages are transferred within the SSL session; any secret information remains secure because of the encrypted communication messages within the SSL session.

However, the server needs to determine the identity of the user before allowing the user to have access to protected resources, so the server requires the user to perform an authentication process by sending the client some type of authentication challenge (step 156). The authentication challenge may be in various formats, such as an HTML form. The user then provides the requested or required information (step 157), such as a username or other type of user identifier along with an associated password or other form of secret information.

The authentication response information is sent to the server (step 158), at which point the server authenticates the user or client (step 159), e.g., by retrieving previously submitted registration information and matching the presented authentication information with the user's stored information. Assuming the authentication is successful, an active session is established for the authenticated user or client.

The server then retrieves the originally requested web page and sends an HTTP response message to the client (step 160), thereby fulfilling the user's original request for the protected resource. At that point, the user may request another page within "ibm.com" (step 161) by clicking a hypertext link within a browser window, and the browser sends another HTTP request message to the server (step 162). At that point, the server recognizes that the user has an active session (step 163), and the server sends the requested web page back to the client in another HTTP response message (step 164).

Figure 1D:
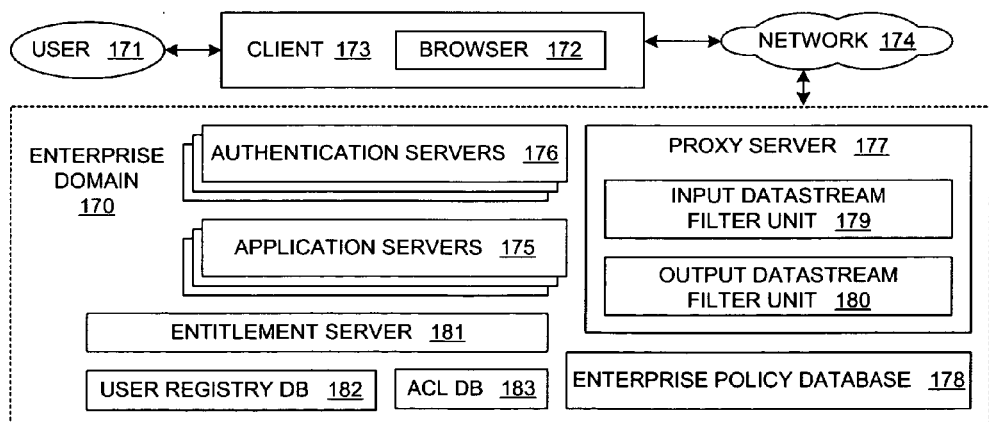
FIG. 1D depicts a block diagram that shows a typical distributed data processing system for an enterprise domain.

With reference now to FIG. 1D, a block diagram depicts a typical distributed data processing system for an enterprise domain. As in a typical corporate computing environment or an Internet-based computing environment, enterprise domain 170 hosts controlled resources that user 171 can access, e.g., by using browser application 172 on client device 173 through network 174. Application servers 175 support accessible resources through web-based applications or other types of applications, including legacy applications. Authentication servers 176 support various authentication mechanisms, such as username/password, X.509 certificates, or secure tokens. Enterprise domain 170 supports multiple servers. Proxy server 177 performs a wide range of functions for enterprise domain 170. Proxy server 177 can be administratively configured through configuration files and enterprise policy database 178 to control the functionality of proxy server 177, e.g., caching web pages in order to mirror the content from an application server or filtering the incoming and outgoing datastreams through input datastream filter unit 179 and output datastream filter unit 180. Input datastream filter unit 179 may perform multiple checks on incoming requests while output datastream filter unit 180 may perform multiple checks on outgoing responses; each check may be performed in accordance with goals and conditions that are specified within various enterprise policies.

Enterprise domain 170 comprises entitlements server 181, which accepts information within user registry database 182 and access control list (ACL) database 183. Entitlements server 181 determines whether users are authorized to access certain services that are provided by application servers 175 within domain 170 by checking policies and/or access control lists against user requests for those services. A set of user-specific entitlements is used by proxy server 177, entitlement server 181, or a combined or coordinated effort between proxy server 177 and entitlement 181 to determine or control access to application servers 175 and other controlled resources in response to user requests.

The above-noted entities within enterprise domain 170 represent typical entities within many computing environments. As was shown with respect to FIG. 1C, web-based applications can utilize various means to prompt users to enter authentication information, often as a username/password combination within an HTML form. In the example that is shown in FIG. 1D, user 171 may be required to be authenticated before client 173 may have access to resources, after which a session is established for client 173 in a manner similar to that described above in FIG. 1C. In FIG. 1D, after receiving an incoming request from client 173, input datastream filter unit 179 may determine whether client 173 has already established a session; if not, an authentication service on authentication servers 176 can be invoked in order to authenticate user 171. If client 173 has already established a session, then additional checks may be performed on an incoming request prior to granting access to a controlled resource; the additional checks may be specified in an enterprise authentication policy.

As discussed above, many enterprises have implemented privacy management operations to address consumer concerns, such as the manner in which an enterprise handles personally identifiable information (PII) that it collects about individuals. However, enterprises often operate multiple online applications, e.g., possibly many related e-commerce applications on a single web site. Implementing privacy management operations using prior art systems has been problematic. Each application that collects personally identifiable information must be modified to include privacy-related functionality. In addition, user consent and preferences are often collected multiple times within a single enterprise, which provides dissatisfying experiences for users of the enterprise services.

Turning now to focus on the present invention, it was noted above that there was a need for a method and system for implementing coherent, enterprise-wide, privacy-related functionality. The present invention is directed to an improved data processing system that is extended to centralize privacy notice, consent, and preference functionality within a privacy proxy that acts on behalf of multiple applications within an enterprise. The present invention is described in more detail below with respect to the remaining figures.

Figure 3:
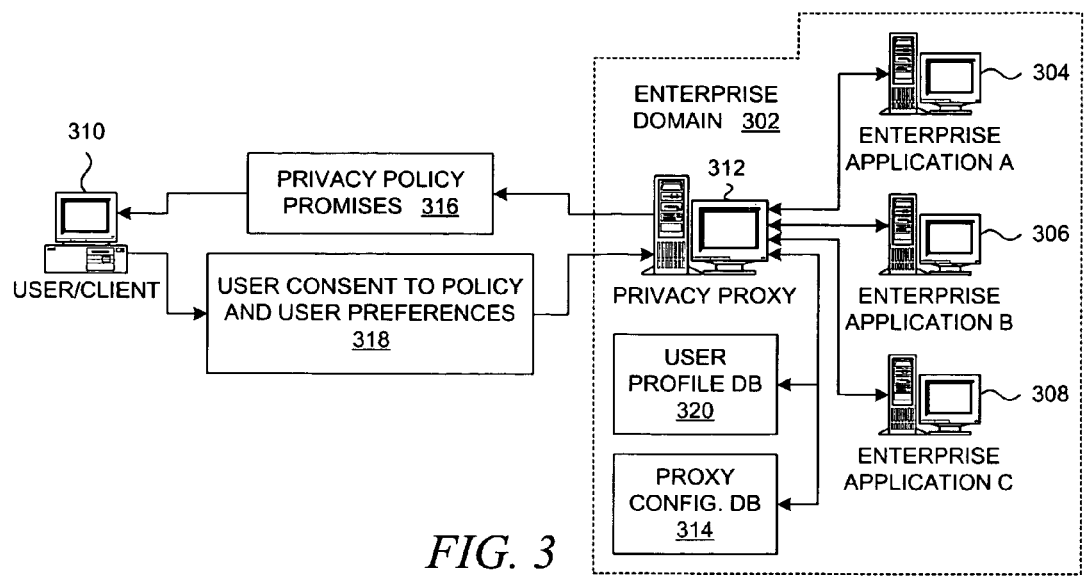
FIG. 3 depicts a block diagram that illustrates a privacy proxy in accordance with an implementation of the present invention.

With reference now to FIG. 3, a block diagram depicts a privacy proxy in accordance with an implementation of the present invention. Enterprise domain 302 supports multiple applications 304, 306, and 308 in a manner similar to enterprise domain 170 that is shown in FIG. 1D. User/client 310 accesses resources that are supported within enterprise domain 302; additional authentication servers, etc., may be implemented within enterprise domain 302 but are not shown in FIG. 3.

Figure 2A:
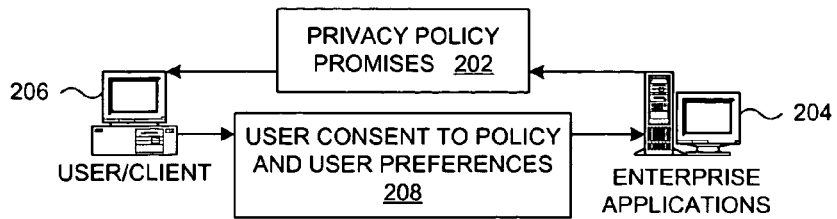
FIG. 2A depicts a block diagram that shows a typical process in which an enterprise domain provides privacy promises to a user and subsequently receives the user's consent to a privacy policy along with the user's preferences concerning the management of the user's personally identifiable information.
Figure 2B:
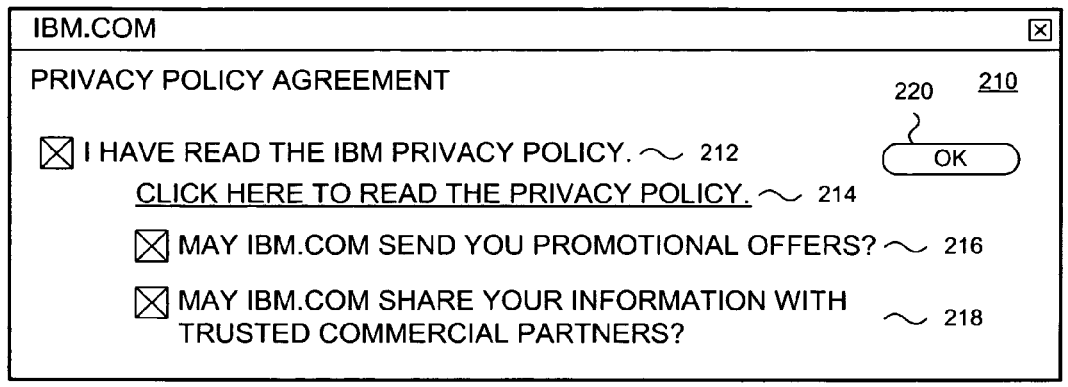
FIG. 2B depicts a typical graphical user interface window for obtaining user consent and user preferences with respect to a privacy policy that is presented by an enterprise with respect to management of personally identifiable information for a user.
Figure 2C:
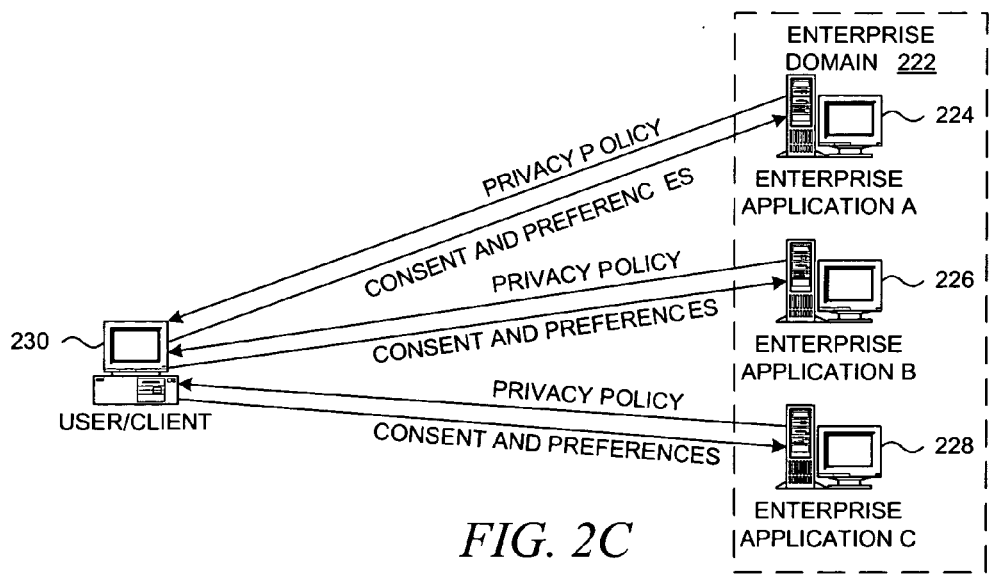
FIG. 2C depicts a block diagram that shows a typical process in which multiple applications within an enterprise domain are responsible for providing privacy promises to a user and subsequently receiving the user's consent to a privacy policy along with the user's preferences concerning the management of the user's personally identifiable information.

In contrast to the independent privacy policy functionality that is exhibited by applications 224-228 that are shown in FIG. 2C, privacy proxy 312 acts as a single point of implementation and administration of the required privacy functionality. Although privacy proxy 312 may be implemented as a stand-alone server or as a stand-along application, privacy proxy 312 may be implemented as one or more components within another server, application, servlet, plug-in, or other type of component such that the privacy proxying functionality is implemented as an intermediate privacy proxying agent between user/client 310 and applications 304-308.

After user/client 310 attempts to access one of applications 304-308, the application may attempt to collect personally identifiable information. Rather than allowing applications 304-308 to implement privacy functionality individually and separately, privacy proxy 312 intervenes in the outgoing datastream between user/client 310 and applications 304-308 in accordance with configuration parameters within privacy proxy configuration database 314. Privacy proxy 312 provides privacy policy promises 316 and other privacy policy content to user/client 310 and then collects user consent data and user preference data 318 with respect to the privacy policy content. This collected information is then stored within user profile database 320 or other type of similar datastore in association with a user identifier, e.g., by indexing the collected information on the user's identity, such that the information can be retrieved at some future point in time during subsequent sessions or transactions for the user. After the user has consented to the privacy policy as presented by the privacy proxy and then indicated various user preferences, an application would then be allowed to interact with the user to collect the personally identifiable information as required by the application, as explained in more detail hereinbelow.

Figure 4:
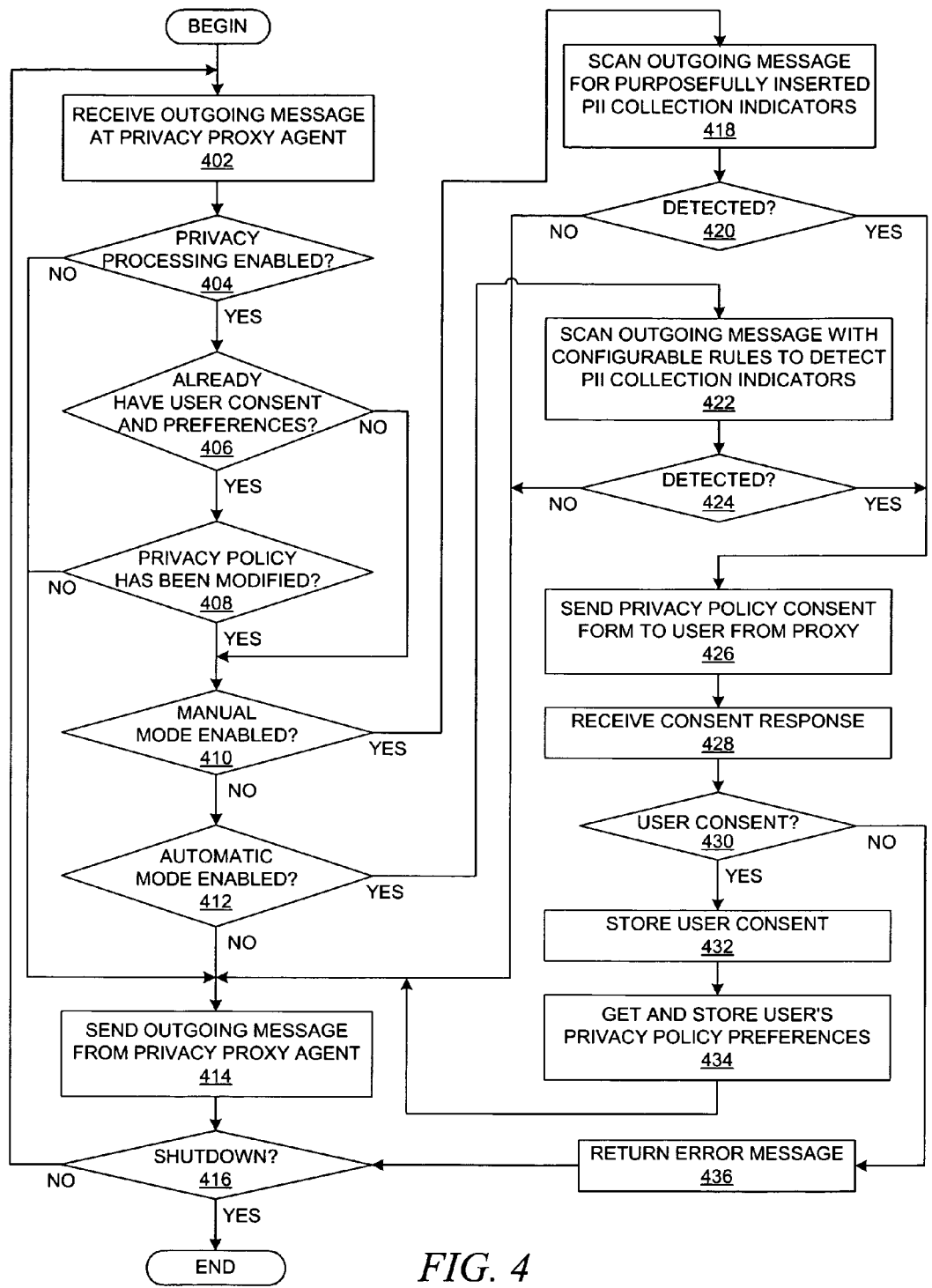
FIG. 4 depicts a flowchart that illustrates a process in which a privacy proxy agent filters an outgoing datastream with respect to privacy functionality in accordance with an embodiment of the present invention.

With reference now to FIG. 4, a flowchart depicts a process in which a privacy proxy agent filters an outgoing datastream with respect to privacy functionality in accordance with an embodiment of the present invention. The process commences when the privacy proxy agent receives an outgoing message from an application (step 402), e.g., an HTTP message with a content body that contains an HTML document that represents a web page; the message may be assumed to be a response message from a server to a client in response to a previous request from the client to access a resource that is controlled by the server or within an enterprise domain. The privacy proxy agent filters outgoing datastreams by examining and/or analyzing outgoing messages; the privacy proxy agent may operate within a series of proxies that perform different functions for an enterprise domain.

The privacy proxy agent determines whether privacy processing has been enabled (step 404), e.g., via a configuration flag that has been set in response to a selection or a configuration by an administrative user, possibly through an administrative utility application, and then stored within a privacy proxy configuration file, parameter file, properties file, environment variables file, or similar datastore; the privacy processing enablement flag allows an administrative user to turn on and off the privacy proxying functionality as deemed necessary. Other additional configuration options may be selectable by an administrative user, as mentioned hereinbelow.

If the privacy proxy agent determines at step 404 that privacy functionality is currently enabled, then the privacy proxy agent determines whether the user has previously consented to the privacy policy of the enterprise, e.g., the operator of the applications that the user/client is attempted to access (step 406). The determination of whether the user has previously consented to the privacy policy may be performed in a variety of manners. For example, the outgoing message may be associated with a particular active session within the enterprise domain, which might be indicated by an associated session identifier that accompanies transactions that are performed within the enterprise domain in response to requests from the client. Thus, the outgoing message has an associated session identifier, and the data structures that support the identified session may contain information that relates the active session to a particular user. In one embodiment, a session-specific data structure may store an indication of whether or not the user has previously consented to the enterprise's privacy policy. In another embodiment, it may be assumed that the user has previously completed an authentication operation such that the identity of the user has been verified, and a copy of the authentication credentials may be stored in a session-specific data structure, wherein the authentication credentials include a user identifier; hence, a session-specific data structure provides a mechanism for relating a session identifier to a user identifier, which may then be used to perform a lookup operation within a datastore that contains a user profile for the identified user, which would include an indication of whether or not the user has previously consented to the enterprise's privacy policy.

If the privacy proxy agent determines at step 406 that the user has previously consented to the enterprise's privacy policy, then there may be no need to obtain the user's consent yet again. However, the enterprise's privacy policy may have been modified in the time period after the enterprise obtained the user's consent because the enterprise is subsequently handling personally identifiable information in a different manner, and the enterprise has modified the privacy policy to reflect the changes in its procedures. Hence, it is usually necessary to obtain the user's consent to a modified privacy policy because the user has not consented to the enterprise's current procedures for handling personally identifiable information. Thus, a determination is made as to whether the privacy policy has been modified since the user's consent was obtained (step 408), e.g., by comparing a timestamp that was associated with the creation of the current privacy policy against a timestamp that was associated with the operation to obtain the user's consent. If the privacy policy has been modified since the user's consent was obtained as determined at step 408, or if the privacy proxy agent determines at step 406 that the user has not previously consented to the enterprise's privacy policy, then the user is subjected to an operation to obtain the user's consent to the current privacy policy in the following steps; otherwise, the enterprise has the user's consent to the current privacy policy, and the process branches to sent the outgoing message.

The operation to obtain the user's consent to the current privacy policy may be performed using two different modes of operation. The privacy proxy agent determines whether a manual mode of privacy proxying functionality has been enabled (step 410), e.g., via a configuration flag that has been set in response to a selection of an option by an administrative user. If so, then the process branches to filter or scan the outgoing message in accordance with the manual mode of privacy proxying functionality, as described in more detail hereinbelow. If the privacy proxy agent determines at step 410 that a manual mode of privacy proxying functionality has not been enabled, then the privacy proxy agent determines whether an automatic mode of privacy proxying functionality has been enabled (step 412), e.g., via a configuration flag that has been set in response to a selection of an option by an administrative user. If so, then the process branches to filter or scan the outgoing message in accordance with the automatic mode of privacy proxying functionality, as described in more detail hereinbelow. If neither the manual mode of operation nor the automatic mode of operation is detected, then the privacy proxy agent may simply continue without performing any further privacy proxying functionality.

After the privacy proxying functionality has been performed, the privacy proxy agent sends the outgoing message from the privacy proxy agent to its intended destination (step 414), e.g., a user/client agent; in some cases, the outgoing message may be the original message that was received at the privacy proxying agent from an application, i.e. the outgoing message has not been modified by the privacy proxying agent, although in some cases, the privacy proxying agent may have modified the outgoing message. Step 414 may also have been reached because the process branched at step 404 after determining that privacy proxying functionality was not enabled or because the process determined at step 408 that the privacy policy had not been modified after determining at step 406 that the user had previously consented to the enterprise's privacy policy.

The privacy proxying functionality acts within an asynchronous event loop whereby it continues to filter outgoing messages as received until the privacy proxy agent is terminated, as represented by a processing step in which the privacy proxy agent determines whether or not it should shutdown (step 416); if not, then the privacy proxy agent branches back to step 402 to continue filtering outgoing messages. If the privacy proxy agent determines at step 416 that it should be terminated, then the process is concluded.

If the privacy proxy agent determines at step 410 that a manual mode of privacy proxying functionality has been enabled, then the privacy proxying agent scans the outgoing message for at least one purposefully inserted indicator that indicates the attempted collection of personally identifiable information (step 418). In other words, the application that originated the outgoing message has purposefully inserted an indicating data element into the outgoing message such that the indicating data element specifically alerts the privacy proxying agent that the outgoing message contains content that attempts to obtain personally identifiable information from the user. If a purposefully inserted indicator is detected within the outgoing message (step 420), then the process branches to continue the privacy proxying functionality, as discussed in more detail hereinbelow. If a purposefully inserted indicator is not detected within the outgoing message, then the process branches to step 414 to send the outgoing message from the privacy proxying agent to the user agent/client.

The purposefully inserted indicator may vary in different implementation or among different applications, and the privacy proxying agent may be configured through parameters in a privacy proxy configuration datastore to scan for one or more purposefully inserted indicators. For example, the privacy proxy agent may be configured to look for a custom meta-tag or a pair of custom meta-tags within the content portion of the outgoing message; if a pair of meta-tags, e.g., "<PII>" and "</PII>" or "<Privacy>" and "</Privacy>", are embedded within an HTML document or an XML document, then the portion of the document between the meta-tags would provide information to the privacy proxying agent about the manner in which the outgoing message should be processed with respect to the enterprise's privacy policy. A custom meta-tag or a pair of custom meta-tags may have associated attributes or parameter values in a manner that is well-known for markup languages. In a more simple embodiment, a single meta-tag without additional parametric information may act as a triggering signal from the application to the privacy proxying agent to conduct privacy proxying functionality with respect to the outgoing message. It should be noted that the scanning operation by the privacy proxying agent is not necessarily limited to analysis of text content within the outgoing message; depending on the format of the outgoing message and the format of the content within the outgoing message, various binary data format may also be analyzed by the privacy proxying agent. It should also be noted that the privacy proxying agent may modify the outgoing message to remove the meta-tags or other type of purposefully inserted indicators in a preferred embodiment; in other embodiments, the privacy proxying agent may not remove the purposefully inserted indicators; e.g., a browser application at a client that does not recognize the custom meta-tags should ignore any tags and associated elements that is does not recognize when processing a markup language document.

If the privacy proxy agent determines at step 412 that an automatic mode of privacy proxying functionality has been enabled, then the privacy proxying agent scans the outgoing message for indications of an attempted collection of personally identifiable information from the user/client (step 422). In other words, the application that originated the outgoing message has not provided a triggering data element within the outgoing message such that a triggering data element would specifically alert the privacy proxying agent that the outgoing message contains content that attempts to obtain personally identifiable information from the user. In this scenario, the privacy proxying agent acts independently of the originating application to ascertain whether or not the outgoing message contains content that attempts to obtain personally identifiable information from the user. In this manner, the originating application does not require any modifications to interoperate with the privacy proxying agent; the privacy proxying agent can be implemented as part of the front-end interface of the enterprise domain, thereby limiting or eliminating any modifications to the back-end applications. If the privacy proxying agent detects that the outgoing message contains content that attempts to obtain personally identifiable information from the user (step 424), then the process branches to continue the privacy proxying functionality, as discussed in more detail hereinbelow. If the privacy proxying agent does not detect that the outgoing message contains content that attempts to obtain personally identifiable information from the user, then the process branches to step 414 to send the outgoing message from the privacy proxying agent to the user agent/client.

The privacy proxying agent may be implemented in a variety of manners to perform the automatic mode of privacy proxying functionality. For example, the privacy proxying agent may be configured to obtain pre-configured rules that have been selected or configured by an administrative user and then stored within a configuration datastore; the rules could be tailored by an administrative user with respect to the known capabilities of the back-end applications that might attempt to collect personally identifiable information from a user. These rules might be regular expressions, and these regular expressions would be evaluated against the content of the outgoing message. A rules engine within the privacy proxying agent evaluates the retrieved rules one-by-one in order to determine if the outgoing message matches a condition that is specified by a rule. The rules may contain variables that represent various text strings that might be found within a document that is carried as content in the outgoing message; in another example, the rules may contain variables that represent various control elements, such as check boxes or text entry field labels, that might be found within a form document that is carried as content within the outgoing message. If the result of the evaluation of the expression is a boolean "true" value or some other type of positive result, then the content of the outgoing message is determined to have satisfied the conditions that are represented within the rules, and the privacy proxying agent determines that the outgoing message has triggered the continuation of the privacy proxying functionality; in other words, the privacy proxying agent determines that the outgoing message contains content that attempts to obtain personally identifiable information from the user.

For example, the privacy proxying agent might evaluate rules that look for common types of data elements that are often used by applications when attempting to collect personally identifiable information. A markup-language-formatted form document that contains text entry field labels that contain the words "Name", "Telephone", and "Email address" might satisfy one rule; another rule might look for a combination of words that might be used within a simple text document that represents a printable form, such as "Name", "Address", and "Required Field" or "Required Information".

If the privacy proxying agent detects a purposefully inserted indicator within the outgoing message during the manual mode of operation, or if the privacy proxying agent detects content that attempts to collect personally identifiable information during the automatic mode of operation, then the privacy proxying functionality continues by sending a privacy policy consent document or form to the user agent (step 426); it may be assumed that the original outgoing message is temporarily stored in some manner within a session-specific or a user-specific data structure for later retrieval. The privacy policy consent form minimally contains some manner for obtaining an indication from the client that the user has or has not consented to the enterprise's privacy policy by requiring a particular computational selection operation by the user. For example, the privacy policy consent form might have an "I Accept" push-button and an "I Decline" push-button within a document that is presented to the user by a user agent application at the client. The privacy policy may be sent along with the privacy policy consent document, or the privacy policy consent document might contain a manner for allowing the user to view the privacy policy, e.g., by selection of a hyperlink within the privacy policy consent document, which causes the user agent at the client to retrieve a privacy policy document that contains the privacy policy as its content.

In any case, the privacy proxying agent receives a response from the client at some subsequent point in time (step 428), and the privacy proxying agent analyzes the response to determine whether it contains the user's consent to the privacy policy (step 430). If the user has agreed to the privacy policy, then the privacy proxying agent stores the user's consent by storing an indicating value in association with the user's identity in some manner, e.g., within the user's profile or some other user-specific account information (step 432); storage of this information allows the consent indicator to be retrieved at some later point in time when the privacy proxying agent again needs to determine whether the user has previously provided the user's consent to the privacy policy that controls the management of the collected user-specific personally identifiable information, e.g., when the privacy proxying agent again executes step 406.

The enterprise may optionally collect additional privacy policy preferences, i.e. other user preferences that are provided by the enterprise with respect to the enterprise's management of any personally identifiable information for the user that is collected by the enterprise. If so, then the privacy proxying agent obtains and stores those user preferences as appropriate indicating values in association with the user's identity in some manner, e.g., within the user's profile or some other user-specific account information (step 434). If the enterprise requests that the user provide these preferences at the same time that the enterprise requests the user's consent, i.e. at step 426, e.g., through the use of check boxes, etc., within a form document, then these preferences may be returned in the same response with the user's consent, i.e. at step 428. If the enterprise waits to obtain the user's consent before requesting these preferences, then the privacy proxying agent would perform another request/response operation with the client at step 434.

After obtaining the user's consent to the enterprise's privacy policy, then the enterprise may collect and process the user's personally identifiable information in accordance with the privacy policy. Hence, the privacy proxying agent can restart the temporarily suspended transaction in which an application was attempting to collect the user's personally identifiable information. The privacy proxying agent retrieves the original outgoing message from its temporary storage location and then sends the outgoing message to the appropriate client at step 414; again, it should be noted that the outgoing message may have been modified by the privacy proxying agent to remove any purposefully inserted indicators that are embedded within the outgoing message that indicate an attempt to obtain personally identifiable information from the user using the outgoing message.

If the user did not consent to the privacy policy as requested by the enterprise via the privacy policy consent form at step 426, then the applications within the enterprise domain should not attempt to collect personally identifiable information from the user; the privacy proxying agent can fail the previously suspended transaction by returning some type of error message to the application that originated the outgoing message (step 436); the format of the error message may be configurable. In other words, the manner in which the privacy proxying agent notifies the application of a failure to obtain the user's consent may be configurable by an administrative user.

In a manual mode of operation, the application has some logic such that it acknowledges the presence of the privacy proxying agent by providing the purposefully inserted indicator within an outgoing message for indicating the intention to collect personally identifiable information; in a similar manner, the application might have logic that allows it to accept error messages specifically from a privacy proxying agent. In this case, the privacy proxying agent may return a specific error message that informs the application that the privacy proxying agent has failed to obtain the user's consent, thereby informing the application that it should perform some type of cleanup operations and/or perform some other type of appropriate action.

In an automatic mode of operation, the application might not be aware of the presence of the privacy proxying agent; the privacy proxying agent operates independently from the application. In this case, the privacy proxying agent needs to return a message to the application that would be expected by the application as if the message were received by the application directly from the user agent/client, i.e. as if the privacy proxying agent were not acting as an intermediate agent between the application and the user agent/client. Hence, the privacy proxying agent might generate a message that is appropriate for the PII request that was contained within the outgoing message. For example, the outgoing message may have provided a "Cancel" button within a form, wherein the "Cancel" button that allows a user to cancel the current transaction at the application; in this case, the privacy proxying agent might generate a message, e.g., an HTTP POST message, that contains data as if the user has selected the "Cancel" button, and the application would perform an appropriate cleanup operation after receiving this type of message. The privacy proxying agent would determine the manner in which to generate the transaction cancellation in accordance with configurable parameters.

The advantages of the present invention should be apparent in view of the detailed description that is provided above. It was noted above that there was a need for a method and system for implementing coherent, enterprise-wide, privacy-related functionality. The present invention is directed to an improved data processing system that is extended to centralize privacy notice, consent, and preference functionality within a privacy proxy that acts on behalf of multiple applications within an enterprise. The privacy proxy of the present invention provides a single point of implementation and administration for privacy-related functionality. The privacy proxy also ensures consistency in the implementation of privacy policy, no matter which application is accessed by a user of the enterprise's services. In addition, the present invention lowers application development and maintenance costs.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing data for a privacy policy within a data processing system, the method comprising:
    intercepting, at a proxy a first message from a server to a client; and
    in response to a determination at the proxy that the first message initiates collection of personally identifiable information from the client by the server, sending a second message from the proxy to the client, wherein the second message requests consent from a user of the client to a privacy policy that concerns management of the personally identifiable information.

2. The method of claim 1 further comprising:
    in response to receiving at the proxy from the client a third message that indicates consent from the user to the privacy policy, sending the first message from the proxy to the client.

3. The method of claim 1 further comprising:
    in response to receiving at the proxy from the client a third message that indicates no consent from the user to the privacy policy, sending a fourth message from the proxy to the server that fails the collection of personally identifiable information from the client by the server.

4. The method of claim 1 further comprising:
    in response to receiving at the proxy a third message that indicates consent from the user to the privacy policy, storing an indication of the consent from the user in association with an identifier for the user.

5. The method of claim 1 further comprising:
    in response to receiving the first message at the proxy, determining whether the user has previously provided consent to the privacy policy; and
    in response to a determination that the user has previously provided consent to the privacy policy, sending the first message from the proxy to the client.

6. The method of claim 1, wherein the step of determining that the first message initiates collection of personally identifiable information from the client by the server further comprises:
    scanning the first message for a data element that has been inserted into the first message by the server to signal to the proxy that the first message initiates collection of personally identifiable information from the client by the server.

7. The method of claim 1, wherein the step of determining that the first message initiates collection of personally identifiable information from the client by the server further comprises:
    scanning the first message for information that is presented to the user by the client to request collection of personally identifiable information by the server.

8. The method of claim 1, wherein the step of determining that the first message initiates collection of personally identifiable information from the client by the server is performed in accordance with a set of configurable rules that contain conditions that are evaluated against the first message.

9. The method of claim 1 further comprising:
    in response to receiving at the proxy a third message that indicates consent from the user to the privacy policy, obtaining by the proxy user preferences for options concerning management of the personally identifiable information.

10. An apparatus for processing data for a privacy policy, the apparatus comprising:
    means for intercepting, at a proxy, a first message from a server to a client; and
    means for sending, in response to a determination at the proxy that the first message initiates collection of personally identifiable information from the client by the server, a second message from the proxy to the client, wherein the second message requests consent from a user of the client to a privacy policy that concerns management of the personally identifiable information.

11. The apparatus of claim 10 further comprising:
    means for sending, in response to receiving at the proxy from the client a third message that indicates consent from the user to the privacy policy, the first message from the proxy to the client.

12. The apparatus of claim 10 further comprising:
    means for sending, in response to receiving at the proxy from the client a third message that indicates no consent from the user to the privacy policy, a fourth message from the proxy to the server that fails the collection of personally identifiable information from the client by the server.

13. The apparatus of claim 10 further comprising:
    means for storing, in response to receiving at the proxy a third message that indicates consent from the user to the privacy policy, an indication of the consent from the user in association with an identifier for the user.

14. The apparatus of claim 10 further comprising:
    means for determining, in response to receiving the first message at the proxy, whether the user has previously provided consent to the privacy policy; and
    means for sending, in response to a determination that the user has previously provided consent to the privacy policy, the first message from the proxy to the client.

15. The apparatus of claim 10, wherein a means for determining that the first message initiates collection of personally identifiable information from the client by the server further comprises:
    means for scanning the first message for a data element that has been inserted into the first message by the server to signal to the proxy that the first message initiates collection of personally identifiable information from the client by the server.

16. The apparatus of claim 10, wherein a means for determining that the first message initiates collection of personally identifiable information from the client by the server further comprises: means for scanning the first message for information that is presented to the user by the client to request collection of personally identifiable information by the server.

17. The apparatus of claim 10, wherein a means for determining that the first message initiates collection of personally identifiable information from the client by the server is operated in accordance with a set of configurable rules that contain conditions that are evaluated against the first message.

18. The apparatus of claim 10 further comprising:
    means for obtaining by the proxy, in response to receiving at the proxy a third message that indicates consent from the user to the privacy policy, user preferences for options concerning management of the personally identifiable information.

19. A computer program product on a computer readable medium for processing data for a privacy policy in a data processing system, the computer program product comprising:
    means for intercepting, at a proxy, a first message from a server to a client; and
    means for sending, in response to a determination at the proxy that the first message initiates collection of personally identifiable information from the client by the server, a second message from the proxy to the client, wherein the second message requests consent from a user of the client to a privacy policy that concerns management of the personally identifiable information.

20. The computer program product of claim 19 further comprising:
   means for sending, in response to receiving at the proxy from the client a third message that indicates consent from the user to the privacy policy, the first message from the proxy to the client.

21. The computer program product of claim 19 further comprising:
   means for sending, in response to receiving at the proxy from the client a third message that indicates no consent from the user to the privacy policy, a fourth message from the proxy to the server that fails the collection of personally identifiable information from the client by the server.

22. The computer program product of claim 19 further comprising:
   means for storing, in response to receiving at the proxy a third message that indicates consent from the user to the privacy policy, an indication of the consent from the user in association with an identifier for the user.

23. The computer program product of claim 19 further comprising:
   means for determining, in response to receiving the first message at the proxy, whether the user has previously provided consent to the privacy policy; and means for sending, in response to a determination that the user has previously provided consent to the privacy policy, the first message from the proxy to the client.

24. The computer program product of claim 19, wherein a means for determining that the first message initiates collection of personally identifiable information from the client by the server further comprises:
   means for scanning the first message for a data element that has been inserted into the first message by the server to signal to the proxy that the first message initiates collection of personally identifiable information from the client by the server.

25. The computer program product of claim 19, wherein a means for determining that the first message initiates collection of personally identifiable information from the client by the server further comprises:
   means for scanning the first message for information that is presented to the user by the client to request collection of personally identifiable information by the server.

26. The computer program product of claim 19, wherein a means for determining that the first message initiates collection of personally identifiable information from the client by the server is operated in accordance with a set of configurable rules that contain conditions that are evaluated against the first message.

27. The computer program product of claim 19 further comprising:
   means for obtaining by the proxy, in response to receiving at the proxy a third message that indicates consent from the user to the privacy policy, user preferences for options concerning management of the personally identifiable information.

* * * * *